(12) United States Patent
Rizzo (10) Patent No.: US 8,813,441 B2
(45) Date of Patent: Aug. 26, 2014

(54) MOUNT FOR PITCHED ROOF AND METHOD OF USE

(75) Inventor: Nathan Rizzo, Williamsville, NY (US)

(73) Assignee: DynoRaxx, Inc., Buffalo, NY (US)

( * ) Notice: Subject to any disclaimer, the term of this patent is extended or adjusted under 35 U.S.C. 154(b) by 0 days.

(21) Appl. No.: 13/253,960

(22) Filed: Oct. 5, 2011

(65) Prior Publication Data

US 2012/0102853 A1    May 3, 2012

Related U.S. Application Data (60) Provisional application No. 61/404,618, filed on Oct. 5, 2010, provisional application No. 61/431,112, filed on Jan. 10, 2011.

(51) Int. Cl.
*E04D 13/18* (2014.01)

(52) U.S. Cl.
USPC .......... 52/173.3; 248/148; 248/188.1; 52/466

(58) Field of Classification Search
USPC ............... 52/173.3, 24, 25, 466, 506.05, 544, 52/547; 24/455; 248/148, 188.1, 351, 248/354.1; 136/244, 251; 126/623
See application file for complete search history.

(56) References Cited

U.S. PATENT DOCUMENTS

| | | | | |
|---|---|---|---|---|
| 3,261,139 | A * | 7/1966 | Bond | 52/786.13 |
| 4,435,934 | A * | 3/1984 | Kim | 52/309.7 |
| 5,571,338 | A * | 11/1996 | Kadonome et al. | 136/251 |
| 5,678,383 | A * | 10/1997 | Danielewicz | 52/775 |
| 6,254,397 | B1 * | 7/2001 | Elmer | 439/6 |
| 6,269,596 | B1 * | 8/2001 | Ohtsuka et al. | 52/173.3 |
| 6,360,491 | B1 * | 3/2002 | Ullman | 52/22 |
| 6,412,239 | B1 * | 7/2002 | Miller | 52/204.1 |
| 6,414,237 | B1 * | 7/2002 | Boer | 136/251 |
| 6,672,018 | B2 * | 1/2004 | Shingleton | 52/173.3 |
| 6,988,344 | B1 * | 1/2006 | Krueger | 52/464 |
| 7,435,134 | B2 * | 10/2008 | Lenox | 439/567 |
| 7,600,349 | B2 * | 10/2009 | Liebendorfer | 52/173.3 |
| 7,634,875 | B2 * | 12/2009 | Genschorek | 52/173.3 |
| 7,748,175 | B2 * | 7/2010 | Liebendorfer | 52/173.3 |
| 7,774,998 | B2 * | 8/2010 | Aschenbrenner | 52/173.3 |
| 7,780,472 | B2 * | 8/2010 | Lenox | 439/567 |
| 7,976,257 | B2 * | 7/2011 | Kufner | 411/84 |
| 8,191,321 | B2 * | 6/2012 | McClellan et al. | 52/173.3 |
| 8,256,170 | B2 * | 9/2012 | Plaisted et al. | 52/173.3 |
| 8,413,944 | B2 * | 4/2013 | Harberts et al. | 248/500 |
| 8,424,255 | B2 * | 4/2013 | Lenox et al. | 52/173.3 |

(Continued)

OTHER PUBLICATIONS

Smartrack Installation Asphalt Shingle—http://www.smartrack.jp/eng/asphalt.html—Sep. 1, 2011.

*Primary Examiner* — Brent W Herring
(74) *Attorney, Agent, or Firm* — Paul T. Lavoie, Esq.

(57) ABSTRACT

In one embodiment, there is a mount for a pitched roof. The mount comprises a fastening plate. The fastening plate includes at least one support extending upwardly from the fastening plate to support a pair of mounting surfaces a predetermined distance above the pitched roof. At least a portion of the fastening plate extends laterally from the one or more supports. The pair of mounting surfaces is configured to support at least one photovoltaic panel. The mount further includes a clamp housing between the pair of mounting surfaces and receives a clamp. The clamp comprises a pair of laterally extending clamp plates and at least one clamp stabilizer configured to prevent the clamp plate from tilting when the clamping force is applied.

10 Claims, 7 Drawing Sheets

(56) References Cited

U.S. PATENT DOCUMENTS

| | | |
|---|---|---|
| 2004/0163338 A1 | 8/2004 | Liebendorfer |
| 2006/0156651 A1* | 7/2006 | Genschorek .................... 52/200 |
| 2008/0000173 A1 | 1/2008 | Lenox et al. |
| 2009/0000220 A1 | 1/2009 | Lenox |
| 2009/0232616 A1 | 9/2009 | Sekreta et al. |
| 2009/0250580 A1 | 10/2009 | Strizki |
| 2010/0275549 A1* | 11/2010 | Bruce et al. ..................... 52/698 |
| 2010/0276558 A1* | 11/2010 | Faust et al. ................ 248/222.14 |
| 2011/0017278 A1* | 1/2011 | Kalkanoglu et al. .......... 136/251 |
| 2011/0214365 A1* | 9/2011 | Aftanas ........................ 52/173.3 |
| 2011/0214367 A1* | 9/2011 | Haddock et al. ............. 52/173.3 |
| 2012/0248271 A1* | 10/2012 | Zeilenga .................. 248/231.41 |
| 2013/0091786 A1* | 4/2013 | DuPont et al. ............... 52/173.3 |

\* cited by examiner

MOUNT FOR PITCHED ROOF AND METHOD OF USE

CROSS-REFERENCE TO RELATED APPLICATIONS

The present application claims the benefit of U.S. Provisional Application 61/404,618 filed Oct. 5, 2010 and U.S. Provisional Application 61/431,112 filed Jan. 10, 2011. Both of these applications are incorporated by reference herein in their entirety.

BACKGROUND OF THE INVENTION

1. Field of the Invention

This invention relates to devices, systems and methods for mounting solar panels on a pitched roof.

2. Discussion of State of the Art

There is a growing market for alternative energy. Alternative energy includes energy that is generated from wind turbines, water powered turbines, and energy from the sun. Alternative energy not only potentially provides cleaner sources of energy that are good for the environment, but the relative low cost of operating and maintaining an alternative energy system, such as a photovoltaic power system, has given an individual home owner the ability to generate his own power at a cost that is close to the cost of purchasing energy off of the national grid. Thus, solar generated electricity is not only a way of making the environment cleaner; it is a means for greater energy independence at a competitive cost. The cost of generating electricity by photovoltaic systems typically require government incentives and tax credits to make it financially enticing for most investors. Even so, the break even point for a solar panel system is typically about 8 years.

Should photovoltaic cells become less expensive or more efficient, the overall cost would provide incentive to more homeowners, landowners or business owners to invest in the more environmentally-friendly photovoltaic system. A significant part of the cost of a solar panel system is the installation cost and the cost of the racking system. Reducing the cost of racking system can be accomplished by making the parts easier to manufacture and therefore cheaper. Improvements that make the system easier or faster to install can also reduce the cost of installation bringing photovoltaic technology closer to being an affordable alternative to conventional energy sources.

Photovoltaic cells can be mounted on a flat roof system or a pitched roof system. Pitched roof mounting systems are typically designed for the type of roof and building material. Most homes are wood frame houses with composition shingles made of fiberglass and/or asphalt. The roofs are pitched at an angle that is typically between 15 degrees to 60 degrees radian from horizontal. The photovoltaic mounts for this type of roof are typically nailed or screwed into the underlying roof or supporting rafters.

UNIRAC® SOLARMOUNT® Installation with Top Mounting Clamps, Installation Manual 201.1 (2005) and U.S. Des. Pat. No. D496,248 shows a pitched roof mounting system that employs a network of rails supported by posts that are screwed into the underlying rafters. The photovoltaic panels are then fastened to the rails. However, securing a system of rails to a roof with a pitch can be dangerous and requires multiple steps. A jig is required to ensure that the rail support posts are fastened in the right place. Rails are long, relatively heavy and awkward to handle. However, rails allow the clamps to slide into position along the rail allowing greater flexibility in positioning the fasteners along the length of the rail. It would be desirable to support photovoltaic panels on a system that does not require installing long rails on a pitched roof.

SunPower is a manufacturer of solar panels and mounting systems. They produce a solar panel mount for asphalt composition shingle roof houses. See SunPower Dealer Technical Support (December 2007). Sun Power produces a pitched roof mount that comprises a base plate with two extrusions that support the solar panel. In a gap between the extrusions is a center bolt that has a clip that secures the solar panel to the extrusions. Two plates extend horizontally outward from the extrusions on opposite sides. Each of the plates has a single row of three holes for securing the mount to the roof on each of the two plates. Two more fastening holes are located between the extrusions.

These systems require use of jigs to preposition the mounts before photovoltaic cells are mounted. It would be desirable to develop a system that would enable installation system without jigs. It is further desirable to develop a pitched roof mounted system that would reduce the overall installation time by reducing installation steps caused by a two-step process of installing mounts and then installing the photovoltaic cells separate SMART RACK® is a mounting system for installing solar panels on a pitched asphalt roof by Takashima & Co., Ltd (smart-r@ta.tak.cojp). See SMART RACK General Installation Manual (2009). The system is mounted by a two part mount that comprises a flanged L-clamp and a T-clamp. The solar panel is secured between the flanges on the T-clamp and the L clamp. The T-clamp is inserted into a notched channel in the flanged l-clamp. The clamp does not bear down on the solar panel. Rather a horizontally directed screw fastens the panel to the T-clamp. The L-portion of the flanged L-clamp has two rows of holes to secure the T-clamp to the L-clamp.

There is still a need for a device, system and method for mounting solar panels to a roof that are easy to install, reduce installation time, improve safety by eliminating rails. It would be further advantageous if they can be installed without a jig and can be adjustable in one or more directions. The present invention addresses one or more of these and other needs.

SUMMARY OF THE INVENTION

The present invention is a mounting bracket for a pitched roof. The mounting bracket accommodates panels of a variety of widths. The clamp is equally effective at clamping either one or a pair of clamps so separate clamp designs are not needed for clamps at row end or clamps used between rows of solar panels. The mounting bracket of one embodiment has a one-sided clamp plate so that the mounting bracket can be positioned using the solar panel to determine the position of the mounting bracket and then affixed without having to remove the solar panel to affix the mounting bracket in place. The clamp plate is slidable along the length of the mounting bracket so that the clamp position can be moved along the width of the mounting bracket. This accommodates small tolerance errors during installation. Furthermore, the clamps can be adjusted to ensure that each of the clamps can be aligned in rows.

In one embodiment, there is a mounting bracket for a pitched roof. The mounting bracket comprises a laterally extending fastening plate having a plurality of fastening holes in at least two rows. The mounting bracket includes a pair of mounting blocks having a pair of laterally extending mounting surfaces. The pair of mounting blocks are affixed to and extending generally perpendicular to the fastening plate for mounting at least one object to at least one of the surfaces a predetermined distance above the fastening plate. A damp is included that comprising (i) a pair of laterally extending clamp plates that bear against the pair of mounting surfaces to clamp at least one object when a clamping force is applied (ii) a pair of clamp stabilizers extending perpendicular to the clamp plates and received into a pair of clamp stabilizer channels to restrict tilting of the clamp plates relative to the mounting surfaces (iv) a clamping rod extending from the mounting plates and the mounting bracket configured to create a clamping force between the mounting surface and the mounting plates.

The mounting bracket of another embodiment has clamp stabilizers that are guide plates extending perpendicular from the clamp plates into channels to prevent tilting of the clamp plates relative to the mounting surface such that the clamp can clamp one object between one clamp plate and one mounting surface as effectively as clamping a pair of objects between the respective pair of clamp plates and mounting surfaces.

The mounting bracket of one embodiment has clamping rod that is a threaded bolt and nut. The nut is secured to the mounting bracket in a channel that permits longitudinal movement of the bolt relative to the nut to create a clamping force.

In still another embodiment, the nut is a square nut and fits into a clamp housing to prevent pivoting of the nut relative to the clamp housing, the clamp housing further extends above the mounting surface and the pair of stabilizer channels are defined by the space between the clamp housing and the mounting blocks on either side of the clamp housing.

In one embodiment, the threaded bold is slidably and pivotally received into the clamp hosing and the nut is slidably but not pivotally received in the clamp housing so that the clamp is capable of being positioned at a range of position along the length of the clamp housing. Typically, the range of positions is a minimum of one inch and a maximum of the length of the clamp housing.

In another embodiment, the object is a solar panel, and the clamp is configured to secure solar panels having a thickness ranging from at least one inch to three inches.

In another embodiment, the fastening plate is adjacent one of the mounting blocks and is not adjacent the other. Optionally, the fastening plate includes a sealant on the bottom of the fastening plate. Typically, the sealant is a strip of butyl mastic rubber.

In one embodiment, there is a method of installing solar panels having a predetermined length, predetermined width and predetermined thickness on a pitched roof. The method comprises the step of providing a generally horizontal base line on the pitched roof. A first row of a plurality of mounting brackets such as set forth in one or more embodiments above are affixed along the base line spaced apart from each other by the length of the panel. Typically, the fastening plate is attached on one side of the mounting bracket only. A second guide line is made perpendicular to the generally horizontal base line. A second row of mounting brackets is spaced apart from the first row by a distance equal to the width of the panel. A first row of solar panels are attached between the first row and the second row. The fastening bracket in the first row of a plurality of mounting brackets is beneath the first row of solar panels. The fastening bracket in the second row of a plurality of mounting brackets is not beneath the first row of solar panels, The first row of mounting brackets is spaced apart using a solar panel and not a jig as a measurement guide. The second row of mounting brackets is spaced apart by using a solar panel and not a jig as a measurement guide.

In one embodiment, there is a mount for a pitched roof. The mount comprises a fastening plate. The fastening plate includes at least one support extending upwardly from the fastening plate to support a pair of mounting surfaces a predetermined distance above the pitched roof. At least a portion of the fastening plate extends laterally from the one or more supports. The lateral portion of the fastening plate has a plurality of fastening holes in at least two rows on the plate.

The pair of mounting surfaces is configured to support at least one photovoltaic panel. At least one of the mounting surfaces is a predetermined distance above the pitched roof.

The mount further includes a clamp housing between the pair of mounting surfaces comprises vertical abutment surfaces defining a spacer and a longitudinally extending clamp receiving channel.

The mount further receives a clamp. The clamp comprises a pair of laterally extending clamp plates that are configured to cooperate with the pair of mounting surfaces to bear against and clamp at least one solar panel when a clamping force is applied. The clamp further comprises at least one clamp stabilizer configured to prevent the clamp plate from tilting when the clamping force is applied. The clamp further comprises a clamping rod extending from the mounting plates and the mounting bracket configured to create a clamping force between the mounting surface and the mounting plates. The clamping rod is slidably received into the longitudinally extending clamp receiving channel.

In one embodiment, at least one support comprises a pair of mounting blocks that respectively support the pair of mounting surfaces.

In another embodiment, the at least one clamp stabilizer slidably extends perpendicular to the clamp plate and along at least one stabilizer surface in the mount. The at least one clamp stabilizer impinges against the at least one stabilizer surface restricting tilting movement of the clamp plate and the at least one stabilizer while allowing the clamp to slide along the stabilizer surface.

In still another embodiment, the at least one clamp stabilizer is slidably received in a stabilizer channel in the mount. The at least one clamp stabilizer impinges against the at least one stabilizer surface restricting tilting movement of the clamp plate and the at least one stabilizer while allowing the clamp to slide along the stabilizer surface.

In one embodiment, the clamp stabilizers are guide plates extending perpendicular from the clamp plates into channels to prevent tilting of the clamp plates relative to the mounting surface such that the clamp can clamp one object between one clamp plate and one mounting surface as effectively as clamping a pair of objects between the respective pair of clamp plates and mounting surfaces.

In another embodiment, the clamping rod is a threaded bolt and nut. The nut is secured to the mounting bracket in a channel that permits longitudinal movement of the bolt relative to the nut to create a clamping force.

In still another embodiment, the object is a solar panel and the clamp is configured to secure solar panels having a width ranging from at least one inch to three inches.

In one embodiment, the nut is a square nut and fits into a clamp housing to prevent pivoting of the nut relative to the clamp housing. The clamp housing further extends above the mounting surface. The pair of stabilizer channels is defined by the space between the clamp housing and the mounting blocks on either side of the clamp housing.

In another embodiment, the fastening plate is adjacent one of the mounting blocks and is not adjacent the other.

In still another embodiment, the fastening plate includes a sealant on the bottom of the fastening plate. Preferably, the sealant is a strip of butyl mastic rubber.

In one embodiment, the threaded bold is slidably and pivotally received into the clamp housing and the nut is slidably but not pivotally received in the clamp housing so that the clamp is capable of being positioned at a range of position along the length of the clamp housing.

In still another embodiment, the range of positions is a minimum of one inch and a maximum of the length of the clamp housing.

The method of the present invention further includes a method of installing solar panels having a predetermined length, predetermined width and predetermined thickness on a pitched roof. The method comprises the steps of:
 (a) providing a generally horizontal base line on the pitched roof;
 (b) providing a plurality of mounting brackets, wherein each mounting bracket comprises a fastening plate, a pair of supports extending upward from the fastening plate to form support surfaces and a clamp mechanism between the pair of supports, at least a portion of the fastening plate extends laterally outward from the pair of supports and has at least two rows of fastening holes on the at least a portion of the fastening plate;
 (c) affixing a first row of mounting brackets along the base line by the fastening plate on one side of the mounting bracket only;
 (d) placing a first row of solar panels in the first row of mounting brackets after the step (c) of affixing a first row;
 (e) positioning a second row of mounting brackets on an opposite side of the first row of solar panels from the first row of a plurality of mounting brackets to position the second row of mounting brackets a distance equal to the width of the panel, wherein the at least a portion of the fastening brackets of the second row is not beneath the first row of solar panels;
 (f) affixing the second row of mounting brackets to the roof by the fastening plate on one side of the second row of mounting brackets without removing the first row of solar panels from the first row of mounting brackets; and
 (g) clamping the first row of solar panels to the first row and the second row after the step (f) affixing the second row of mounting brackets.

Optionally, the method of one embodiment further comprising the steps of:
 (h) placing a second row of solar panels in the second row of mounting brackets after the step (f) of affixing the second row;
 (i) positioning a third row of mounting brackets on an opposite side of the second row of solar panels from the second row of mounting brackets to position the third row of mounting brackets a distance equal to the width of the panel, wherein the at least a portion of the fastening brackets of the third row is not beneath the second row of solar panels;
 (j) affixing the third row of mounting brackets to the roof by the fastening plate on one side of the third row of mounting brackets without removing the second row of solar panels from the second row of mounting brackets; and
 (k) clamping the second row of solar panels to the second row and the third row after the step (j) of affixing the third row of mounting brackets.

Alternatively or additionally, the mounting brackets comprise the mounting bracket defined in claim 1, wherein the step (e) of positioning the second row further comprises aligning each mounting bracket in the second row with a corresponding mounting bracket in the first row and the step (i) of positioning the third row further comprises aligning each mounting bracket in the third row with a corresponding mounting bracket in the second row and a corresponding mounting bracket in the third row.

In still another embodiment, the method comprising the additional steps of:
 (l) slidably adjusting the clamp plates of each of the mounting brackets in the second row with a corresponding clamp plate of the corresponding mounting bracket in the first row; and
 (m) slidably adjusting the clamp plates of each of the mounting brackets in the third row with a corresponding clamp plate of the corresponding mounting bracket in the first row and a Optionally, the mounting bracket includes one or more of the features of the mount set forth above and further described herein.

DETAILED DESCRIPTION OF THE INVENTION

Reference is made to FIGS. 1A-1E and FIG. 2 which show an embodiment of the clamping mechanism of another embodiment of the present invention. FIG. 1A-1E shows a photovoltaic mount 10 of one embodiment. The mount includes a base plate 12 that is placed on the roof at a desired location to support and secure a photovoltaic panel (not shown) to a roof including a pitched roof.

Figure 1A:
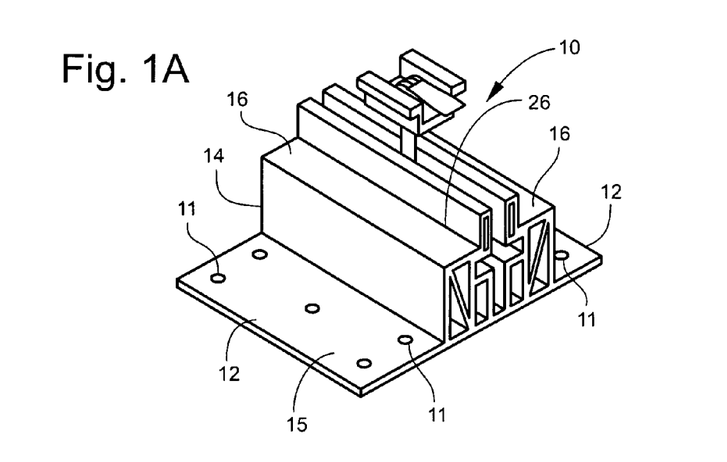
FIG. 1A is a top perspective view of a mounting bracket of one embodiment with a clamp in place.
Figure 1B:
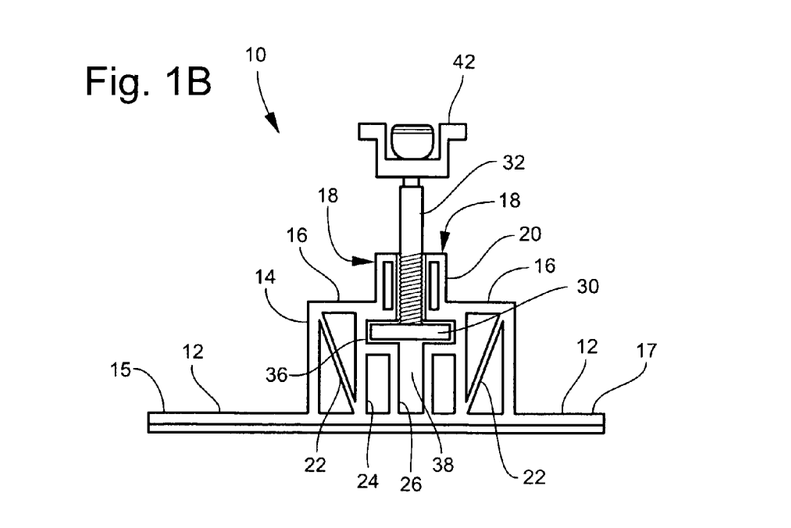
FIG. 1B is a side elevated view of a mounting bracket of FIG. 1A.
Figure 2:
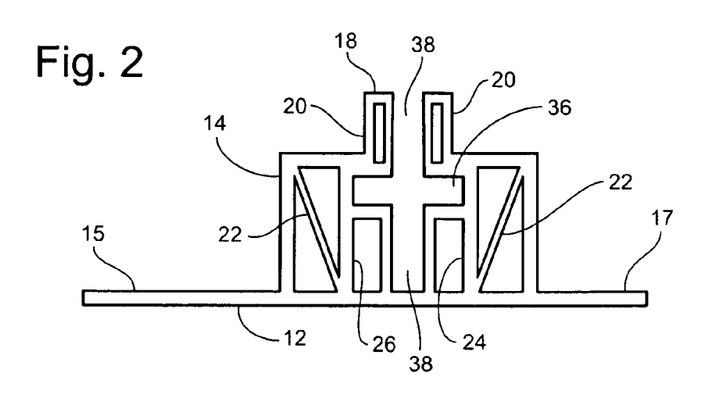
FIG. 2 is a side elevated view of a mounting bracket of FIG. 1A without a clamp in place.

The base plate 12 is secured to the roof by a plurality of fasteners received through the holes 11 in the base plate 12. Preferably, wood screws are used to secure the plate 12 to the roof. In another preferred embodiment, deck screws are used so that the plate can be affixed to any location on the deck and the base plate 12 does not have to be positioned over a roof rafter or beam. In one embodiment, a first side 15 of the base plate 12 has a sufficient number of holes to safely and adequately secure the entire mount on the first side 15 without requiring screws on the second side 17. In one embodiment, the mount 10 is made of extruded aluminum. In another embodiment, the mount 10 is made of a thermoplastic or extrudable resin material. In one embodiment the resin is a noryl resin such as noryl selgfn resin.

The base plate 12 receives a baffled mounting block 14 onto which the photovoltaic panel is supported by ledge 16 or mounting surface on both sides of the mounting block 14 extending in a first horizontal direction (x). Horizontal spacing in a second horizontal direction (z) perpendicular to the first horizontal direction is accomplished by spacer 18 forming an abutment edge 20. To reduce material cost and maximize the strength of the mounting block 14, baffles 22, 24, and 26 are formed in the block 14. In one embodiment, the baffles 22, 24, and 26 extend the length of the block 14 in a first horizontal direction and are positioned to maximize the strength of the block 14 and the clamping features described hereafter with minimal material cost. Thus, optimization of the position of the baffles 22, 24, and 26 is within the ability of a person of ordinary skill in the art.

A channel 28 extends the length of spacer 18 in the first horizontal direction (x). The channel 28 is sized and configured to slidably receive a nut 30 and bolt 32 of clamp 34. The clamp 34 can be seen with reference to FIG. 3 and continued reference to FIG. 1. The nut 30 is received into nut channel 36 that slidably receives the nut 30 but prevents the nut 30 from rotating. In one embodiment, the nut 30 is a square nut. The bolt 32 is threadably received into the nut 30 and slides along a bolt channel 38 in the first direction (x). The nut channel 36 is vertically positioned medially along the vertical height of the bolt channel 38 so that the threaded portion of the bolt 32 can threadably extend through the nut 30 to accommodate vertical positioning of the clamp 34 to secure a wide range of range of photovoltaic panel thicknesses. The clamp 34 of one embodiment has a two sided top plate 42 that forms two lips 44 under which a photovoltaic panel is configured to be received on both sides of the mount 10. The mounting block 14 with a two-sided top plate 42 is used to position a support structure between two adjacent photovoltaic cells.

Figure 3A:
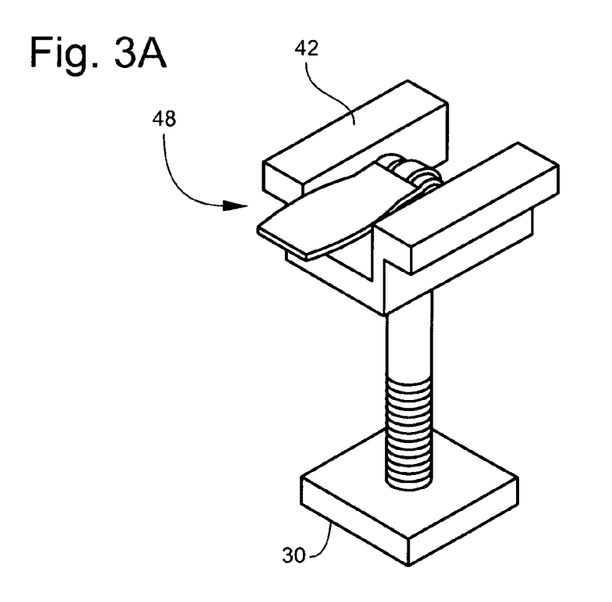
FIG. 3A is a perspective view of the assembled clamp of FIG. 1A.
Figure 3B:
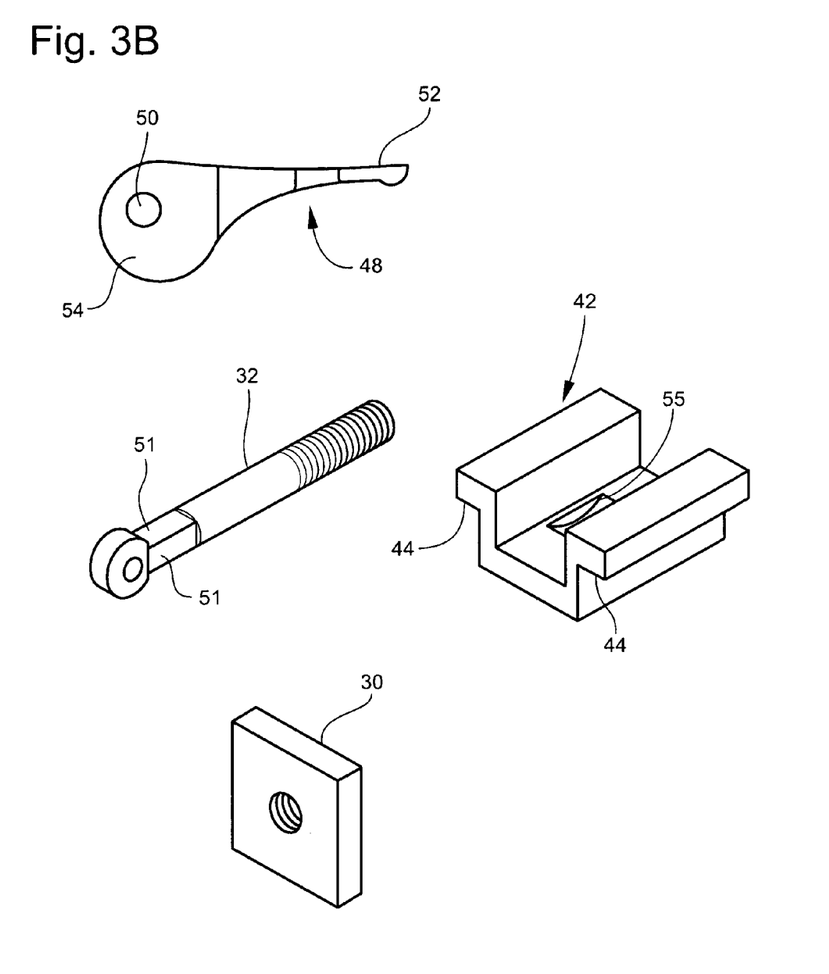
FIG. 3B is a dissembled clamp of FIG. 1A

With continued reference to FIG. 1 and further reference to FIG. 3, the top of the clamp bolt 32 forms an eye 46 that is pivotally attached to a cam lever 48 by a common pin 50. The top of the clamp bolt 32 is milled to form two parallel faces 51 and has a thickness that corresponds to the distance between the cam lobes 54. The cam lever 48 has a lever handle 52 and a pair of eccentric cam lobes 54 that are positioned in a downward position when the lever 48 is oriented perpendicular to the bolt 32 and extends outward when the lever 48 is positioned parallel to the bolt 32. When the cam lever 48 is positioned parallel to the bolt 32, the cam lever 48 can be rotated to turn the bolt 32 relative to the nut 30 to adjust the vertical height of the top plate 42. The bolt 32 can turn within the bolt hole 53 of the top plate 42. Also the top plate 42 receives or is formed with a channel 55 that is configured to prevent the cam lever 48 from rotating once it is clamped into horizontal or downward position. The advantage of this channel is that by preventing the relative rotation of the bolt relative to the nut, the clamps never have to be tightened. In conventional systems, periodic tightening of the clamps is required.

The vertical height of the top plate 42 is adjusted to accommodate positioning the photovoltaic panel under one of the top lips 44 of the top plate 42 when the cam lever 48 is positioned vertically. When the cam lever 48 is positioned horizontally and perpendicular to the bolt 32, the photovoltaic panel is securely clamped into position when the cam lever is moved into a horizontal position which causes the cam lobe 54 to impinge against the top plate 42 thereby clamping the photovoltaic panel on one or both side of the ledge.

Figure 4A:
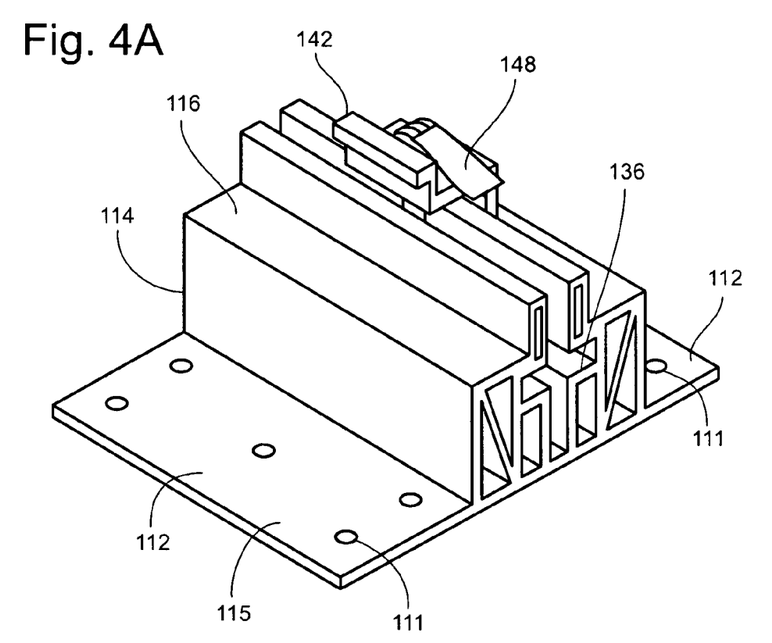
FIG. 4A is a perspective view of a mounting bracket of one embodiment with a clamp in place.
Figure 4B:
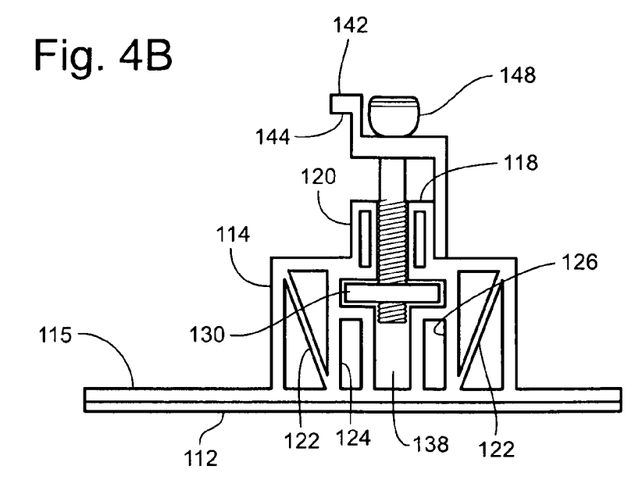
FIG. 4B is a side elevated view of the clamp of FIG. 4A.
Figure 5A:
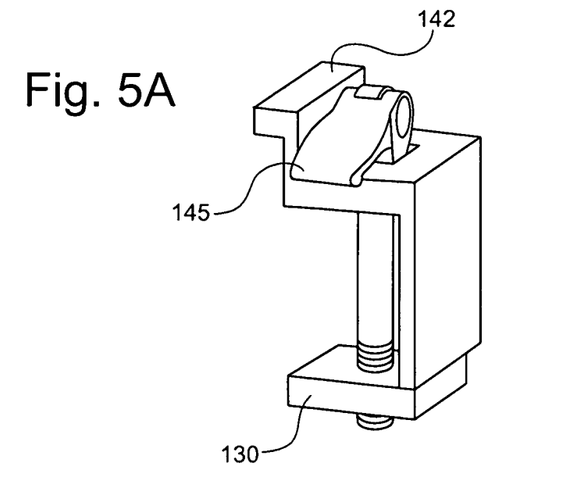
FIG. 5A is a perspective view of the assembled clamp of FIG. 4A
Figure 5B:
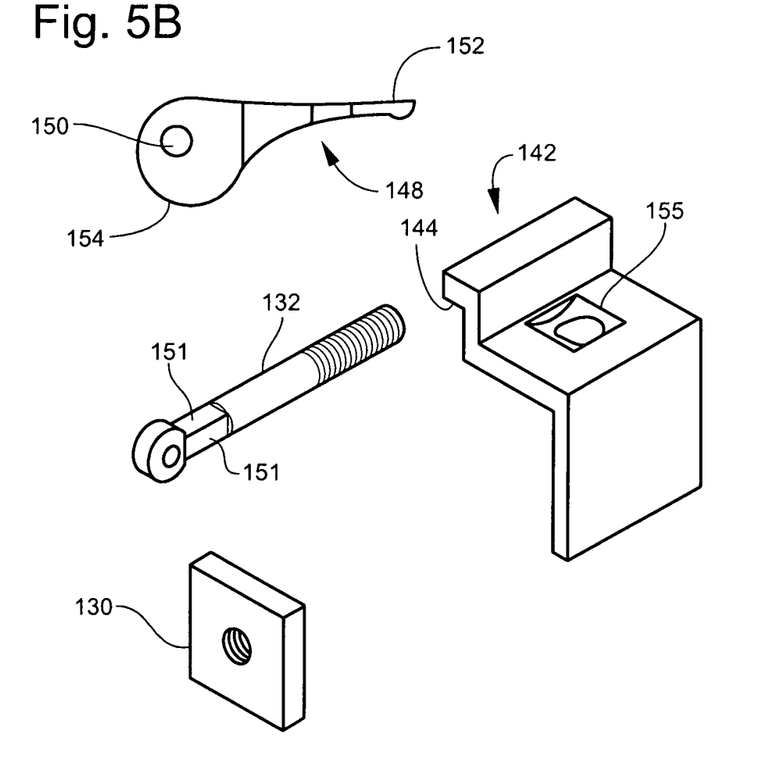
FIG. 5B is a dissembled view of the clamp of FIG. 4A

Reference is made to FIGS. 4 and 5 which show a photovoltaic mount 110 of an embodiment with a single sided clamp. The system includes a base plate 112 that is placed on the roof at a desired location to support and secure a photovoltaic panel (not shown) to a roof including a pitched roof. The base plate 112 is secured to the roof by a plurality of fasteners received through the holes 111 in the base plate 112.

The base plate 112 receives a baffled mounting block 114 onto which the photovoltaic panel is supported by ledge 116 on both sides of the mounting block 114 extending in a first horizontal direction (x). Horizontal spacing in a second horizontal direction (z) perpendicular to the first horizontal direction is accomplished by spacer 118 forming an abutment edge 120. To reduce material cost and maximize the strength of the mounting block 114. Baffles 122, 124, and 126 are formed in the block 114.

A channel 128 extends the length of spacer 118 in the first horizontal direction (x). The channel 128 is sized and configured to slidably receive a nut 130 and bolt 132 of clamp 134. The clamp can be seen with reference to FIG. 5 and continued reference to FIG. 4. The nut 130 is received into nut channel 136 that slidably receives the nut 130 but prevents the nut 130 from rotating. In one embodiment, the nut 130 is a square nut. The bolt 132 is threadably received into the nut 130 and slides along a bolt channel 138 in the first direction (x). The nut channel 136 is vertically positioned medially along the vertical height of the bolt channel 138 so that the threaded portion of the bolt 132 can threadably extend through the nut 130 to accommodate vertical positioning of the clamp 134 to secure a wide range of range of photovoltaic panel thicknesses. The clamp 134 of one embodiment has a one sided top plate 142 that forms one lip 144 under which a photovoltaic panel is configured to be received on sides of the mount 110. The mounting block 114 with a one-sided top plate 142 is used to position a support structure at the end of a row or column of photovoltaic cells where only one photovoltaic cell is clamped.

With continued reference to FIGS. 4 and 5, the top of the clamp bolt 132 forms an eye 146 that is pivotally attached to a cam lever 148 by a common pin 150. The top of the clamp bolt 132 is milled to form two parallel faces 151 and has a thickness that corresponds to the distance between the two cam head. The cam lever 48 has a lever handle 152 and a pair of eccentric lobes 154 that is positioned in a downward position when the lever 148 is oriented perpendicular to the bolt 132 and extends outward when the lever 148 is positioned parallel to the bolt 132. When the cam lever 148 is positioned parallel to the bolt 132, the cam lever 148 can be rotated to turn the bolt 132 relative to the nut 130 to adjust the vertical height of the top plate 142. The bolt 132 can turn within the bolt hole 153 of the top plate 142. Also the top plate 142 receives or is formed with a channel 155 that is configured to prevent the cam lever handle 152 from rotating once it is clamped into horizontal or downward position.

The vertical height of the top plate 142 is adjusted to accommodate positioning the photovoltaic panel under the top lip 144 of the top plate 142 when the cam lever 148 is positioned vertically. When the cam lever 148 is positioned horizontally and perpendicular to the bolt 132, the photovoltaic panel is securely clamped into position when the cam lever 148 is moved into a horizontal position which causes the cam lobe 154 to impinge the top plate 142 against the photovoltaic panel on one side of the ledge.

Figure 6:
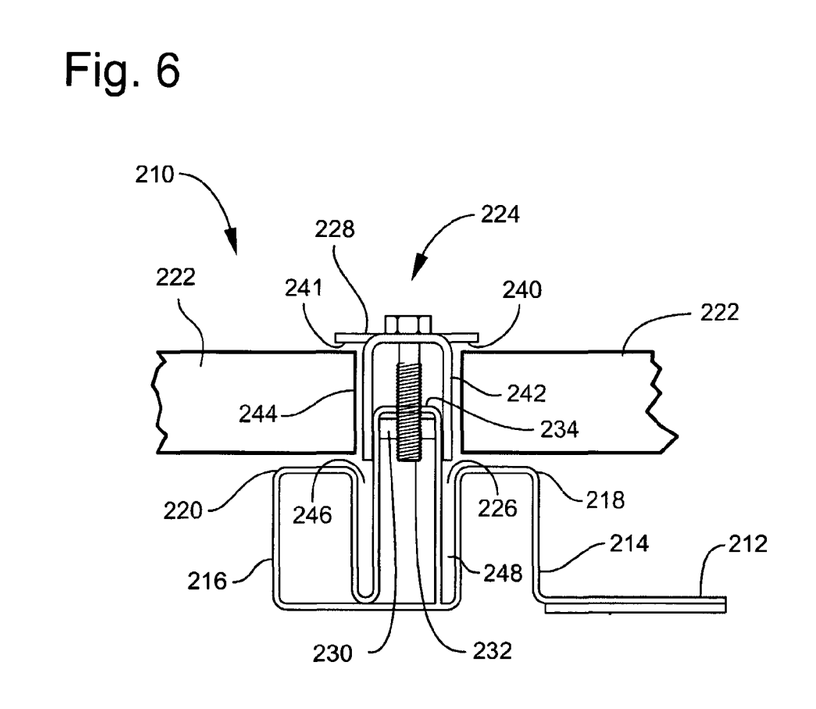
FIG. 6A is a side elevated view of a mounting bracket of one embodiment of the present invention.
FIG. 6B is a perspective view of the mounting bracket of one embodiment of the present invention.

With reference to FIGS. 6A and 6B, the mounting bracket 210 comprises two mounting blocks 214 and 216. The mounting blocks 214 and 216 act as supports for the mounting surfaces 218 and 220. Mounting block 214 is adjacent to the fastening plate 212. Mounting block 216 is on the opposite side of the mounting bracket 210 from mounting block 214. The mounting blocks 214 and 216 have two mounting surfaces 218 and 220. The mounting surfaces 218 and 220 provide the support for the object being clamped, including the solar panel 222. The mounting blocks 214 and 216 provide for vertical spacing of the panel 222 from the roof by a predetermined distance equal to the height of the mounting blocks or the distance from the fastening plate 212 to the mounting surface 218 or 220.

Medially spaced between the two mounting blocks is a clamp mechanism 224. The clamp mechanism has a clamp housing 226 and a clamp plate 228. The sides of the clamp housing 226 define abutment surfaces against which the sides of the panels 222 approach when properly installed. When each mounting block 214 and 216 supports panels 222, the clamp housing 226 serves as a spacer to separate the panels 222 from each other by a predetermined distance.

The clamp housing 226 has a longitudinally extending nut channel 234 that extends the entire length of the nut channel and a longitudinally extending bolt channel 236 that is formed in the top side of the clamp housing 226 for part of the length of the clamp housing 226. In one embodiment, the clamp rod is a nut 230 (preferably a square nut) and bolt 232 mechanism. In another embodiment, the clamp 224 is a cam actuated lever clamp similar to the device used for the axis of a quick release bicycle wheel.

The clamp plate 228 is connected to the clamp housing 226 by a nut 230 and bolt 232. The nut 230 is slidably but not rotatably received into the nut channel 234 of the clamp housing 226. The bolt 232 is slidably and rotatably received through the bolt channel 236 and is threaded at one end into the nut 230. Rotation of the bolt in the clamp housing causes vertical movement of the bolt and clamp plate 228 relative to the mounting bracket and the mounting blocks 214 and 216. The clamp plate 228 cooperates with the mounting surfaces 218 and 220 of the mounting blocks 214 and 216 to secure a solar panel to the mount assembly.

Prior art clamp mechanisms require one design of a clamp plate for brackets that affix only one panel and a separate assembly that affixes two panels. This is because the clamps that affix two panels are capable of pivoting or tilting so that the clamp surface is not parallel to the object being clamped (e.g. solar panel) unless two equal sized objects are clamped on both sides of the clamp. The present design addresses this drawback in prior art designs.

The clamp plate 228 has two laterally extending clamp surfaces 240 and 241 and at least two vertically extending clamp stabilizers. Here seen as vertically extending fins 242 and 244. The fins 242 and 244 are configured to slidably extend along the surface of the clamp housing 226 and/or be received in longitudinally extending stabilizer channels 246 and 248. The fins 242 and 244 cooperate with the surface of the clamp housing 226 and the walls of the channels 246 and 248 to restrict the clamp plate 228 from being tilted. So that the clamp surface 240 is parallel to the mounting surfaces. Thus, the stabilizer channels 246 and 248 should be sufficiently wide to receive the laterally extending fins 242 and 244 so that they can freely slide along the channels but to prevent the clamp plate from tilting or rotating laterally away from a generally horizontal position relative to the mounting surfaces 218 and 220.

Figure 7:
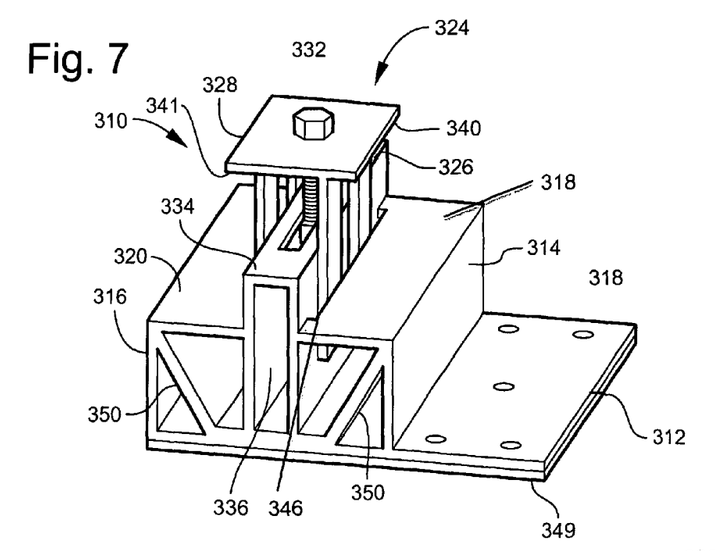
FIG. 7 is a perspective view of the mounting bracket of one embodiment of the present invention.
Figures 8, 9:
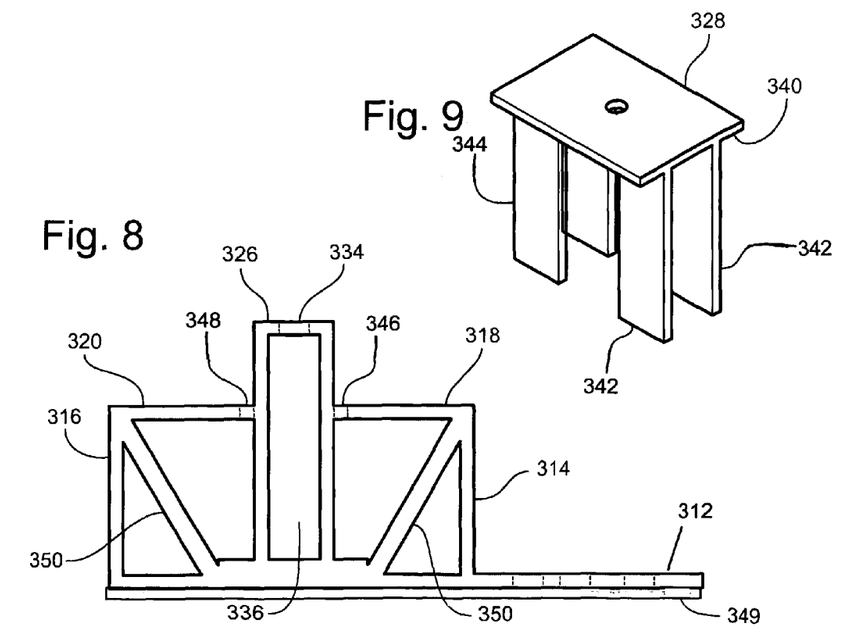
FIG. 8 is a side elevated view of the mounting bracket of one embodiment without the clamp in place.
FIG. 9 is a perspective view of the clamp plate and fins of one embodiment of the present invention.

With reference to FIG. 7, FIG. 8, and FIG. 9 the mounting bracket 310 comprises two mounting blocks 314 and 316. The mounting blocks 314 and 316 act as supports for the mounting surfaces 318 and 320. Mounting block 314 is adjacent to the fastening plate 312. Mounting block 316 is on the opposite side of the mounting bracket 310 from mounting block 314. The mounting blocks 314 and 316 have two mounting surfaces 318 and 320. The mounting surfaces 318 and 320 provide the support for the object being clamped, including the solar panel 322. The mounting blocks 314 and 316 provide for vertical spacing of the panel 322 from the roof by a predetermined distance equal to the height of the mounting blocks or the distance from the fastening plate 312 to the mounting surface 318 or 320.

Medially spaced between the two mounting blocks is a clamp mechanism 324. The clamp mechanism has a clamp housing 326 and a clamp plate 328. The sides of the clamp housing 326 define abutment surfaces against which the sides of the panels 322 approach when properly installed. When each mounting block 314 and 316 supports panels 322, the clamp housing 326 serves as a spacer to separate the panels 322 from each other by a predetermined distance.

The clamp housing 326 has a longitudinally extending nut channel 334 that extends the entire length of the nut channel and a longitudinally extending bolt channel 336 that is formed in the top side of the clamp housing 326 for part of the length of the clamp housing 326. In one embodiment, the clamp rod is a nut (preferably a square nut) and bolt 332 mechanism. In another embodiment, the clamp 324 is a cam actuated lever clamp similar to the device used for the axis of a quick release bicycle wheel.

The fastening plate 312 receives a sealant on the underside to ensure that when mounted on the roof, the roof penetrating fasteners do not cause the roof to leak. In one embodiment, the sealant is a layer 349 of butyl mastic rubber.

The clamp plate 328 is connected to the clamp housing 326 by a nut, not shown, and bolt 332. The nut is slidably but not rotatably received into the nut channel 334 of the clamp housing 326. The bolt 332 is slidably and rotatably received through the bolt channel 336 and is threaded at one end into the nut. Rotation of the bolt in the clamp housing causes vertical movement of the bolt and clamp plate 328 relative to the mounting bracket and the mounting blocks 314 and 316. The clamp plate 328 cooperates with the mounting surfaces 318 and 320 of the mounting blocks 314 and 316 to secure a solar panel to the mount assembly.

Prior art clamp mechanisms require one design of a clamp plate for brackets that affix only one panel and a separate assembly that affixes two panels. This is because the clamps that affix two panels are capable of pivoting or tilting so that the clamp surface is not parallel to the object being clamped (eg. solar panel) unless two equal sized objects are clamped on both sides of the clamp. The present design addresses this drawback in prior art designs.

The clamp plate 328 has two laterally extending clamp surfaces 340 and 341 and at least two vertically extending clamp stabilizers. Here seen as vertically extending fins 342 and 344. The fins 342 and 344 are configured to slidably extend along the surface of the clamp housing 326 and/or be received in longitudinally extending stabilizer channels 346 and 348. The fins 342 and 344 cooperate with the surface of the clamp housing 326 and the walls of the channels 346 and 348 to restrict the clamp plate 328 from being tilted. So that the clamp surface 340 is parallel to the mounting surfaces. Thus, the stabilizer channels 346 and 348 should be sufficiently wide to receive the laterally extending fins 342 and 344 so that they can freely slide along the channels but to prevent the clamp plate from tilting or rotating laterally away from a generally horizontal position relative to the mounting surfaces 318 and 320.

The mounting bracket 310 is formed by extruded aluminum. Baffles 350 and 352 are formed in the bracket and extend the length to provide strength. Alternatively the mounting bracket 310 can be formed with extruded plastic.

What is claimed is:

1. A mount for a pitched roof, comprising:
   a fastening plate;
   at least one support extending upwardly from the fastening plate supporting a pair of mounting surfaces a predetermined distance above the pitched roof, wherein at least a portion of the fastening plate extends laterally from the at least one support, the lateral portion of the fastening plate has a plurality of fastening holes in at least two rows on the plate;
   wherein the pair of mounting surfaces are configured to support at least one photovoltaic panel wherein at least one of the mounting surfaces is a predetermined distance above the pitched roof;
   a clamp housing between the pair of mounting surfaces comprising vertical abutment surfaces defining a spacer configured to laterally space apart the at least one photovoltaic panel and a pair of longitudinally extending stabilizer channels, each defined by a space between the clamp housing and the mounting surfaces on either side of the clamp housing and a longitudinally extending clamp receiving channel;
   a clamp comprising (i) a pair of laterally extending clamp plates that are configured to cooperate with the pair of mounting surfaces to bear against and clamp the at least one photovoltaic panel when a clamping force is applied (ii) at least one clamp stabilizer configured to prevent the clamp plate from tilting when the clamping force is applied (iii) a clamping rod comprising a threaded bolt and square nut extending from the clamp plates to the clamp housing to create a clamping force between the mounting surface and the clamp plate, wherein the clamping rod is slidably received into the longitudinally extending clamp receiving channel and wherein the nut is received in the clamp receiving channel to prevent pivoting of the nut relative to the clamp housing, the clamp housing further extends above the mounting surface and the pair of stabilizer channels.

2. The mount of claim 1, wherein the at least one support comprises a pair of mounting blocks that respectively support the pair of mounting surfaces.

3. The mount claim 1, wherein the at least one clamp stabilizer slidably extends perpendicular to the clamp plate and along at least one stabilizer surface in the mount, wherein the at least one clamp stabilizer impinges against the at least one stabilizer surface restricting tilting movement of the clamp plate and the at least one stabilizer while allowing the clamp to slide along the stabilizer surface.

4. The mount of claim 1, wherein the at least one clamp stabilizer is slidably received in at least one of the stabilizer channels in the mount, wherein the at least one clamp stabilizer impinges against at least one stabilizer surface of the at least one of the stabilizer channels restricting tilting movement of the clamp plate and the at least one clamp stabilizer while allowing the at least one clamp stabilizer to slide along the at least one stabilizer surface.

5. The mount of claim 1, wherein the clamp stabilizers are guide plates extending perpendicular from the clamp plates into channels to prevent tilting of the clamp plates relative to the mounting surface such that the clamp can clamp one object between one clamp plate and one mounting surface as effectively as clamping a pair of objects between the respective pair of clamp plates and mounting surfaces.

6. The mount of claim 2, wherein the fastening plate is adjacent one of the mounting blocks and is not adjacent the other.

7. The mount of claim 1, wherein the fastening plate includes a sealant on the bottom of the fastening plate.

8. The mount of claim 7, wherein the sealant is a strip of butyl mastic rubber.

9. The mount claim 1, wherein the threaded bolt is slidably and pivotally received into the clamp housing and the nut is slidably but not pivotally received in the clamp housing so that the clamp is capable of being positioned at a range of positions along the length of the clamp housing.

10. The mount of claim 9, wherein the range of positions is a minimum of one inch and a maximum of the length of the clamp housing.

* * * * *